March 7, 1961 E. WUKOWITZ 2,973,871
HOLDER FOR DIFFERENT LAYERS OF CAKE
Filed Oct. 14, 1957
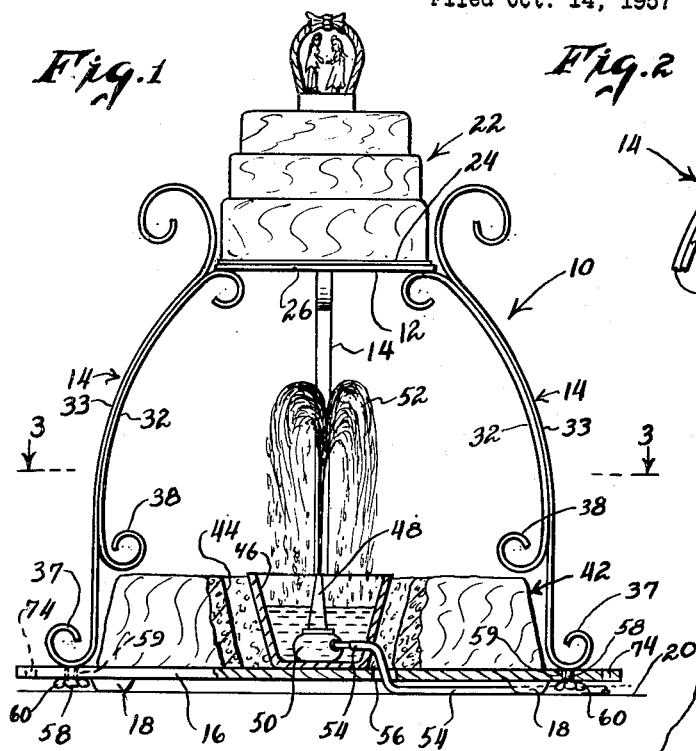
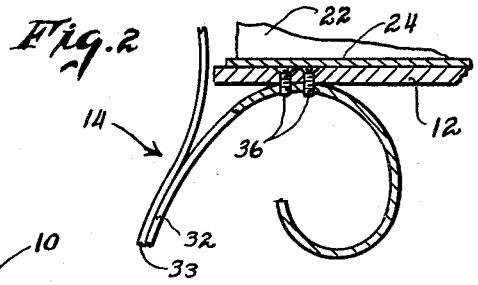
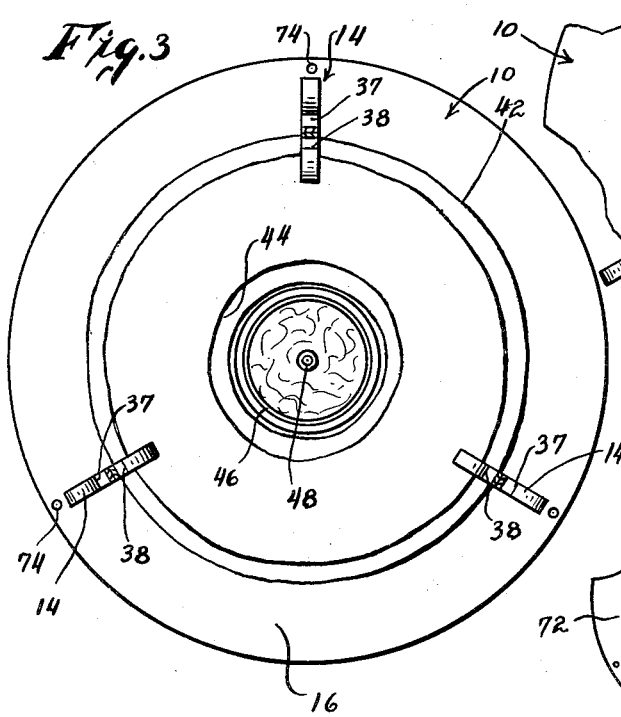
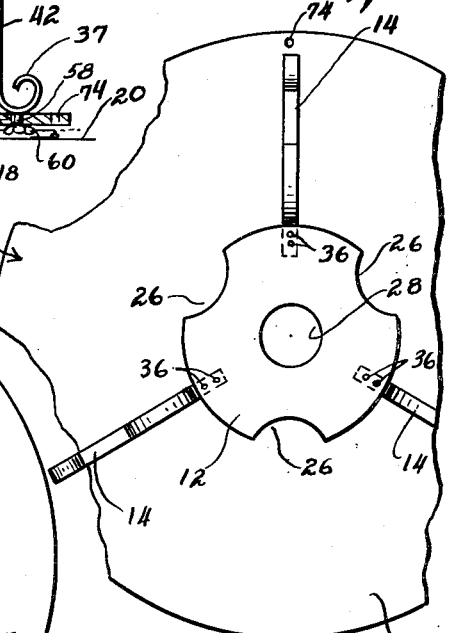
INVENTOR.
Edward Wukowitz
BY Emery, Whittemore, Sandoe & Dix
ATTORNEYS

United States Patent Office 2,973,871
Patented Mar. 7, 1961

2,973,871

HOLDER FOR DIFFERENT LAYERS OF CAKE

Edward Wukowitz, Wells Ave., Congers, N.Y.

Filed Oct. 14, 1957, Ser. No. 689,949

7 Claims. (Cl. 211—134)

This invention relates to holders intended primarily for wedding cakes or other large cakes.

It is an object of the invention to provide a holder by which lower and upper portions of a cake can be held in spaced relation, one above the other, and to provide such a holder with ornamentation which adds to the festive appearance of the cake.

One advantage of the invention is that it provides for novel decoration, such as a fountain at the center of the lower portion of the cake, with ample head room for a reasonably high fountain of champaign or water, and with sufficient spacing between the upper and lower portions of the cake to make the fountain visible even when looking down at the cake from locations fairly close to the cake. Another advantage of the invention is that it makes the cake seem larger. The cake is thus made more impressive without increase in cost.

Another object of the invention is to provide a two level cake holder constructed with detachable fastening means and parts that can be disassembled and placed in a compact space for shipping or storage.

Still another object is to provide a cake holder of the character indicated with means for changing the size of the holder to accommodate cakes of different size.

Other objects, features, and advantages of the invention will appear or be pointed out as the specification proceeds.

In the drawing, forming a part hereof, in which like reference characters indicate corresponding parts in all the views;

Figure 1 is a side elevation, partly broken away and in section, showing the cake holder of this invention with a cake thereon, and with a fountain at the center of the lower portion of the cake;

Figure 2 is a greatly enlarged fragmentary, sectional view showing the connection of one of the supports to the platform on which the upper portion of the cake rests;

Figure 3 is a sectional view taken on the line 3—3 of Figure 1;

Figure 4 is a top plan view of the cake holder shown in Figure 1, but with the cake removed; and Figure 5 is a top plan view of another platform which replaces that shown in Figure 4 when the cake holder is adjusted for a cake of different size.

Figure 1 shows a cake holder 10 having a platform 12 resting on a plurality of supports 14 at angularly spaced locations around the circumference of the platform. In the construction illustrated there are three supports 14 with their angular spacing approximately 120 degrees. The positions of the two foremost supports 14 are distorted in Figure 1 for clearer illustration. The actual positions of these supports around the vertical axis of the cake holder is shown in Figure 3.

The lower ends of the supports 14 rest on a base 16, and the supports are preferably attached to this base 16. There are cleats or feet 18 extending downwardly from the bottom of the base 16 for giving the bottom of the base some clearance from a table 20 on which the cake holder is placed when in use.

An upper portion 22 of a wedding cake is shown on the platform 12. The cake usually has a flat plate 24 under it and by which this upper portion 22 of the cake is lifted. The diameter of this upper portion of the cake is substantially equal to that of the platform. There are preferably cut-outs 26 (Fig. 4) around the circumference of the platform for decoration and to facilitate the lifting of the cake from the platform. The plate 24 (Fig. 1) extends over these cut-outs 26. The platform 12 may have other cut-out areas if desired; one other cut-out consisting of a central hole 28 is shown in the platform 12 in Figure 4. The platform 12 can be made of different kinds of material, but is preferably a metal plate and quite stiff or semi-rigid.

The supports 14 also can be made of different kinds of material. They are conveniently and economically made of strap material; for example, strap iron. In the illustrated construction each support 14 consists of an inner strap 32 and an outer strap 33. The opposite ends of the outer straps 33 being shaped to form outwardly curved scrolls; and the opposite ends of the inner straps 32 are shaped to form inwardly curved scrolls. These inwardly curved scrolls at the upper ends of the inner straps 32 provide the areas of the supports 14 on which the platform 12 rests, as is best shown in Figure 2.

Each support 14 is attached to the platform 12. In order to have the cake holder constructed for convenient disassembly, detachable fastening means are used to connect the supports 14 to the platform 12. These fastening means are here shown as screws 36 extending through the platform 12 and threading into the supports 14. Two screws 36 are used for each support 14 when it is desired to have the support and platform assembly fairly rigid without being connected to the base 16 (Fig. 1).

The lower ends 38 of the inner srtaps 32 are spaced a substantial distance above the lower ends 37 of the supports 14 so that the scrolls on the inner straps 32 can be extended inwardly over a lower cake portion 42 resting on the base 16.

If the lower cake portion is to be used with a fountain or other center novelty, an open space 44 is left at a center region of the lower portion 42 of the cake. A bowl 46 is placed in the space 44 and rests on the base 16. Within the bowl 46 there is a fountain nozzle 48 to which champaign or other liquid is supplied by a motor-driven pump in a housing 50 below the nozzle 48 and within the bowl 46.

The liquid is discharged upwardly from the nozzle 48 to form a fountain 52 no wider than the bowl 46 so that the liquid drops back into the bowl for repeated recirculation to the fountain.

Power to operate the motor for the fountain is supplied through an electric cable 54. A hole 56 is provided in the base 16 for passage of the cable 54 through the base 16. The feet 18 are slightly higher than the thickness of the cable 54 so as to leave clearance for the cable between the base 16 and the table top 20.

In accordance with conventional practice, the upper portion 22 of the cake is of smaller diameter than the lower portion 42 and the supports 14 curve inwardly to compensate for the difference in diameter of the platform 12 and base 16. It will be understood that the shape or contour of the supports 14 may be different from that illustrated and that more than three supports can be used if desired. In addition to their function as supports for the platform 12, the supports 14, or at least parts thereof, serve a decoration for the entire assembly.

The lower ends of the supports 14 are preferably attached to the base 16 and the connections are by detachable fastening means consisting of bolts 58 in the illustrated construction. Figure 1 shows the bolts 58 welded to the underside of the respective supports 14. These bolts extend through holes 59 in the base 16, and there are wing nuts 60 screwed on the bolts 58 below the base 16. These bolts 58 and the wing nuts 60 are short enough to fit into the clearance between the bottom of the base 16 and the top of the table 20. The reason for using wing nuts 60 is to facilitate removal of the rest of the cake holder from the base 16 when the lower portion of the cake is to be placed on the base and the diameter of this lower portion is too large to pass through the space between the supports 14.

In order to adjust the cake holder for a larger cake, the platform 12 and the base 16 are detached from the supports 14. A larger platform 72 (Fig. 5) is used to replace the platform 12, and is attached to the supports 14 by the same screws 36.

The bolts 58 at the lower ends of the supports 14 are inserted through holes 74 nearer the circumference of the base 16. The holes 59 are at angularly spaced locations around a circle; and the holes 74 are similarly located but around a circle of somewhat larger diameter; the increase in circle diameter being substantially equal to the increase in the diameter of the platform 72 over that of the platform 12.

When made with a substantial degree of resilience in the supports 14, the cake holder can be adjusted for a larger or smaller diameter upper portion of the cake without changing the size of the lower portion. Similarly, the bottom can be adjusted without changing the top. The drawing shows two circles of holes 59 and 74 in the base 16 but more circles of holes can be provided, if desired, for greater adjustment to cakes of different size.

The base 16 is preferably made of plywood, and imperforate except for the cable hole 56. This provides a base which is stiff for its weight and inexpensive, but other material can be used for the base, and other openings can be provided if the cake is to rest on a plate and it is desirable to have access for lifting the plate from below.

The preferred embodiment of the invention has been illustrated and described, but changes and modifications can be made and some features can be used in different combinations without departing from the invention as defined in the claims.

What is claimed is:

1. A holder for a wedding cake including a platform and three supports at angularly spaced locations around the periphery of the platform, each of the supports comprising inner and outer straps having confronting faces adjacent to one another along most of the length of the inner straps, the upper end of both straps of each support terminating in a scroll and the scroll of each strap turning in the opposite direction from that of the other strap, the scrolls of the inner sraps extending upwardly from their region of divergence with the outer straps and all becoming tangent with a horizontal plane at substantially the same level and then curving inwardly and downwardly and then outwardly at a lower level, detachable fastening means connecting the platform to the scrolls of the inner straps with the platform resting on top of the scrolls of the inner straps, each scroll of the outer straps extending upwardly through a location where it is tangent to a vertical plane and then curving upwardly and outwardly and then downwardly, each scroll of the outer strap passing outside of the platform and extending for a substantial distance above the top of the platform and forming an abutment for preventing transverse displacement of a cake from the platform, and a bottom scroll at the lower end of each outer strap curving outwardly and then upwardly and constituting a foot of the cake holder.

2. The cake holder described in claim 1 and in which the detachable fastening means for each support includes at least two screws extending through the platform and the support and spaced from one another along a radius of the platform.

3. The cake holder described in claim 1 and in which there are open areas through the platform over which a cake on the platform is located, the open areas providing access to the cake for lifting it from the platform.

4. The cake holder described in claim 1 and in which there is a base under the platform at a substantial distance below the platform, and there are means connecting the feet of the supports to the base.

5. The cake holder described in claim 4 and in which the means connecting the lower ends of the supports to the base are bolts, each of which is secured at its upper end to the lower end of one of the supports and each of which extends through a different hole in the base, and a wing nut on the lower end of each of the bolts and adapted to clamp against the bottom of the base.

6. The cake holder described in claim 5 and in which the base has bolt-receiving holes at angularly spaced locations around circles of different diameter, and with the angular spacing corresponding to that of the support, for receiving the bolts which extend downwardly from the lower ends of the support and in accordance with the diameter of a lower portion of a cake located on the base, and platforms of different size for connection to the supports depending upon the diameter of an upper portion of the cake.

7. The wedding cake holder described in claim 1 and in which there is a second platform at the lower end of the holder for supporting a lower section of a wedding cake, and the bottom scrolls rest on a lower platform and are connected thereto by detachable fastening means, and the inner straps have scrolls at their lower ends curving inwardly about the surface of the bottom platform at a substantial distance above the bottom platform to leave clearance for the lower portion of the wedding cake.

References Cited in the file of this patent

UNITED STATES PATENTS

| | | |
|---|---|---|
| 114,718 | Schoney | May 9, 1871 |
| 782,612 | Levey | Feb. 14, 1905 |
| 1,609,242 | Dewey | Nov. 30, 1926 |
| 1,762,805 | Tucker | June 10, 1930 |
| 1,823,616 | Leslie | Sept. 15, 1931 |
| 1,917,564 | Weston | July 11, 1933 |
| 2,791,391 | Uphoff | May 7, 1957 |
| 2,867,248 | Forney | Jan. 6, 1959 |
| 2,880,951 | Springer | Apr. 7, 1959 |

FOREIGN PATENTS

| | | |
|---|---|---|
| 4,216 | Germany | of 1878 |
| 118,425 | Germany | Mar. 8, 1901 |